(12) United States Patent
Abbas

(10) Patent No.: US 7,920,604 B2
(45) Date of Patent: *Apr. 5, 2011

(54) DATA TRANSMISSION IN AN SDH NETWORK

(75) Inventor: Ghani A. M. Abbas, Nottingham (GB)

(73) Assignee: Ericsson AB, Stockholm (SE)

( * ) Notice: Subject to any disclaimer, the term of this patent is extended or adjusted under 35 U.S.C. 154(b) by 339 days.

This patent is subject to a terminal disclaimer.

(21) Appl. No.: 11/541,355

(22) Filed: Sep. 29, 2006

(65) Prior Publication Data

US 2007/0025400 A1    Feb. 1, 2007

Related U.S. Application Data

(63) Continuation of application No. 09/144,782, filed on Sep. 1, 1998, now Pat. No. 7,277,459.

(30) Foreign Application Priority Data

Sep. 5, 1997    (GB) .................................. 9718831.2

(51) Int. Cl.
    *H04J 3/02*    (2006.01)
(52) U.S. Cl. ........................................ 370/539; 370/541
(58) Field of Classification Search .................. None
    See application file for complete search history.

(56) References Cited

U.S. PATENT DOCUMENTS

| | | | | |
|---|---|---|---|---|
| 5,018,132 A | * | 5/1991 | Williams et al. | 370/476 |
| 5,033,044 A | * | 7/1991 | Williams et al. | 370/510 |
| 5,123,010 A | * | 6/1992 | Pospischil | 370/409 |
| 5,251,239 A | * | 10/1993 | Turban et al. | 375/365 |
| 5,361,263 A | * | 11/1994 | Urbansky | 370/505 |
| 5,428,612 A | * | 6/1995 | Scheffel et al. | 370/468 |
| 5,461,622 A | * | 10/1995 | Bleickardt et al. | 370/470 |
| 5,793,760 A | * | 8/1998 | Chopping | 370/355 |
| 5,920,563 A | * | 7/1999 | Fukui et al. | 370/395.5 |
| 5,978,377 A | * | 11/1999 | Kim et al. | 370/395.71 |

FOREIGN PATENT DOCUMENTS

WO    WO 97/33398    9/1997

OTHER PUBLICATIONS

*Characteristics of Synchronous Digital Hierarchy (SDH) Equipment Functional Blocks*, ITU-T Draft Revised Recommendation G.783, pp. 1-238, Aug. 1997.

* cited by examiner

*Primary Examiner* — Ajit Patel
(74) *Attorney, Agent, or Firm* — Kirschstein, et al.

(57)    ABSTRACT

A method for the transmission of data in a synchronous digital hierarchy (SDH) network comprising the steps of transmitting to a node of the network a form of data signal from outside the network, converting the signal into a virtually concatenated information structure and transporting the signal through the network in the virtually concatenated information structure; means for carrying out the method and tributary cards arranged and configured to process signals received in contiguously concatenated form to convert them into virtually concatenated form for transfer across the network; thus providing for data transmitted in high-bandwidth, contiguosly concatenated signals (ie VC-4-4c) to be transported across a SDH network, not itself capable of carrying contiguously concatenated signals.

46 Claims, 3 Drawing Sheets

| V5 |
|---|
| R R R R R R R R |
| D D D D D D D D |
| R R R R R R R R |
| J2 |
| R R R R R R R R |
| D D D D D D D D |
| R R R R R R R R |
| N2 |
| R R R R R R R R |
| D D D D D D D D |
| R R R R R R R R |
| K4 |
| R R R R R R R R |
| D D D D D D D D |
| R R R R R R R R |

Figure 2

DATA TRANSMISSION IN AN SDH NETWORK

CROSS REFERENCE TO RELATED APPLICATIONS

This is a continuation of U.S. patent application Ser. No. 09/144,782, filed Sep. 1, 1998, now U.S. Pat. No. 7,277,459.

BACKGROUND OF THE INVENTION

1. Field of the Invention

The present invention relates to the field of synchronous digital hierarchy (SDH) networks and data transmission therein.

2. Description of the Related Art

In SDH data is transferred in information structures known as virtual containers. A virtual container (VC) is an information structure within SDH which consists of an information payload and path overhead (POH). There are two types of VC: low order (LOVC) and high order (HOVC). LOVC's (eg. VC-12, VC-2 and VC-3) are for signals of less than 140 Mb/s and HOVC's (ie. VC-4) are for 140 Mb/s signals.

With the ever increasing demand for higher data rates there is a continuing need to improve the data transfer capability of networks such as those based on SDH. One way of providing higher bandwidth is concatenation.

Concatenation is a method for the transport over SDH networks of a payload of a bandwidth greater than the capacity of the defined information structures. ITU standard G.707 defines concatenation as follows: a procedure whereby a multiplicity of virtual containers is associated one with another with the result that their combined capacity can be used as a single data container across which bit sequence integrity is maintained. Two types of concatenation have been proposed: contiguous and virtual.

Contiguous concatenation is defined in ITU standards such as G.707. Virtual concatenation for VC-2 has also been identified in ITU G.707 but the means for implementing it has not previously been defined and it has therefore not been implemented. Virtual concatenation for VC-4 has been proposed as a concept but no way of implementing has been devised until now. Furthermore, no method of performing conversion between contiguously concatenated signals and virtually concatenated signals has been defined.

Contiguous concatenation uses a concatenation indicator in the pointer associated with each concatenated frame to indicate to the pointer processor in the equipment that the VC's with which the pointers are associated are concatenated. For example, by contiguously concatenating four VC-4's an information structure with a data rate equivalent to a VC-4-4c could be created. The resulting VC-4-4c equivalent signal has only one path overhead (i.e. 9 bytes only). However many installed SDH networks cannot carry out the necessary processing to support contiguous concatenation. In order to implement contiguous concatenation in such SDH networks it would be necessary to modify the hardware of the equipment in order to handle the concatenated signal. Suitable modification of such a network would be prohibitively expensive.

This can cause a problem when the customer wishes to transfer data which requires a bandwidth too high for the installed SDH network to handle, such as some broadband services. For example a customer may wish to transfer data in VC-4-4c format but would be unable to transport it over current SDH networks which do not support concatenation.

The object of the invention is to provide an SDH network with the capability of carrying signals of increased bandwidth. A further object is to provide for the information content of an STM signal carrying data in contiguously concatenated virtual containers to be transmitted over an SDH network not itself capable of carrying contiguously concatenated signals.

SUMMARY OF THE INVENTION

The present invention provides a method for the transmission of data in a synchronous digital hierarchy (SDH) network comprising the steps of transmitting to a node of the network a form of data signal from outside the network, converting the signal into a virtually concatenated information structure and transporting the signal through the network in the virtually concatenated information structure wherein conversion of the signal comprises processing a path overhead of the signal wherein the integrity of the path overhead information is maintained.

The present invention advantageously provides a method for converting contiguously concatenated signals into virtually concatenated signals for transport in the network.

The present invention provides a means for carrying out either of the above methods.

The present invention also provides a synchronous digital hierarchy (SDH) network in which data is carried in a virtually concatenated information structure, the network comprising tributary cards arranged and configured to process signals received in contiguously concatenated form to convert them into virtually concatenated form for transfer across the network.

In a preferred embodiment the data transfer is achieved by means of a virtually concatenated information structure equivalent to VC-4-4c comprising a set of four virtually concatenated VC-4 signals. This virtually concatenated information structure is referred to in the following by the acronym "VC-4-4vc": this being chosen to reflect the fact that the data rate is the same as that of VC-4-4c, with the "vc" indicating virtual concatenation.

BRIEF DESCRIPTION OF THE DRAWINGS

An embodiment of the invention will now be described by way of example with reference to the accompanying drawings in which

FIG. 2, shows part of the structure of a lower order, VC-2 signal of the prior art;

DETAILED DESCRIPTION OF THE INVENTION

Figure 1:
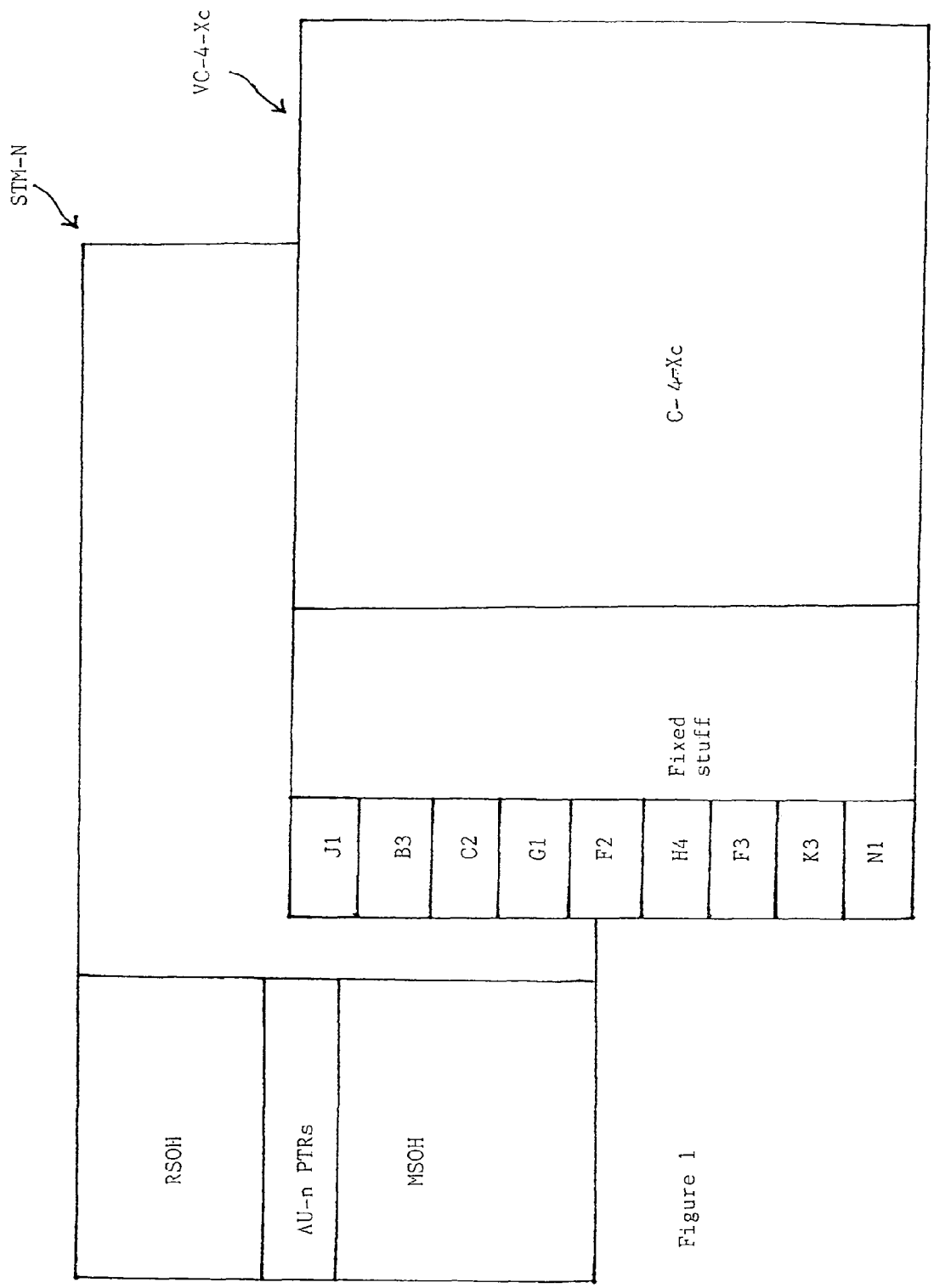
FIG. 1 shows the information structure of a higher order, VC-4 signal of the prior art.

Referring to FIG. 1, this shows synchronous transfer module STM comprising a section overhead SOH, a pointer and a virtual container VC. The VC in turn comprises a path overhead POH, fixed stuff bytes and a container C for the payload.

A network management system manages the transfer of virtually concatenated VC-4's without any modification being required to network equipment. The only hardware modification required is the provision of modified tributary cards capable of identifying the receipt at the network boundary of contiguously concatenated VC-4's and processing them accordingly. Individual VC-4's and virtually concatenated VC-4's are transported in the SDH network in the same way. Hence, four VC-4's, when virtually concatenated, will still have four path overheads.

In the standard configuration a tributary card accepts at its input and delivers at its output an STM-4 signal containing four independent VC-4's (by way of example, each may contain a 140 Mb/s, 3×34 Mb/s or 63×2 Mb/s mapped PDH signals). However, the new tributary card is also capable of accepting at its input and delivering at its output an STM-4 signal containing four contiguously concatenated VC-4 signals: as for example may arise from mapping ATM cells into STM-4 to ITU recommendations I.432 and G.707.

The tributary card will recognise the format of the incoming STM-4 signals: as a contiguously concatenated signal using the concatenation indication in the pointer and act accordingly.

Optionally, the tributary card could also be configured to handle STM-4 signals containing four virtually concatenated VC-4 signals, to meet future demand. The tributary card STM-4 interface meets the requirements of G.957 and G.958. The transport of the ATM/STM-4 signal over the SDH network is transparent and SDH parameters processing and performance monitoring shall apply according to G.826, G.707, G.783 and ETS300 417.

At the ATM/STM-4 input port the pointers of the four concatenated VC-4's are aligned. The resulting, newly generated four VC-4's are processed for transfer across the network as a virtually concatenated information structure (VC-4-4vc) signal by processing their associated path overheads as follows.

Whereas the pointer can indicate delay of the concatenated VC-4's in the VC-4-4vc of up to one frame duration (i.e. 125 μs) higher delays cannot be picked up in this way. Since the differential delay between the VC-4s of a VC-4-4vc as they are transported across the SDH network are unknown, it is necessary to take steps to ensure that the VC-4s so transferred are in the correct sequence. The path trace (J1) value for each of the VC-4's in the VC-4-4vc is given a unique code indicating their order within the VC-4-4vc.

It is also necessary to ensure that the frames of each VC-4 in the VC-4-4vc are correctly ordered. The H4 byte is therefore used for frame sequence indication (FSI) to allow the network to recover the original sequence.

A signal label code is inserted in the C2 byte of each VC-4 of the VC-4-4vc to indicate the payload type, eg an ATM payload, as required. The B3 byte of the received contiguous VC-4-4c signal is processed, as appropriate, to maintain the path integrity.

On the back-plane port of the network node which receives the VC-4-4vc signal the virtually concatenated VC-4's of the VC-4-4vc are aligned using a buffer according to the information provided by the path trace values and the frame sequence values. The size of the buffer is dependent on the maximum differential delay allowed between the VC-4's which constitutes the VC-4-4vc. A value of 8 milliseconds is proposed, by way of example, based on the use of the H4 byte to indicate the frame sequence. However such a buffer size may prove prohibitively large. Therefore it may be necessary to reduce the buffer size by ensuring that the differential delay is kept to the absolute minimum. This may be achieved by ensuring that the four VC-4's in the VC-4-4vc are processed and switched together as well as being transmitted together in the same synchronous transfer module (STM), e.g. STM-4, STM-16, STM-64, and along the same route through the network.

Path trace mismatch on any of the VC-4 in the VC-4-4vc will result in trace mismatch defects on the VC-4-4vc signal. Similarly, signal label mismatch and loss of signal (LOS) of any VC-4 in the VC-4-4vc will result in alarm indication signal (AIS) in the VC-4-4vc.

The contents of the pointers, concatenation indicators and path overhead bytes of the contiguous concatenated VC are transported in other bytes or bits in the virtually concatenated VC. Suitable unused bits include some path overhead bytes of the virtually concatenated VC that are assigned to functions not used during virtual concatenation and the fixed stuff bits of the container four (C4) that forms part of the VC-4.

The pointers, concatenation indicators and path overhead bytes must be restored as appropriate before the signal is transmitted as a contiguous signal outside the network. The path overhead information in the first VC-4 frame in the received virtual concatenated VC-4-4vc signal is inserted in the path overhead of the contiguous concatenated VC-4-4c signal generated by the network for transmission outside the network. Additionally, the B3 value is corrected as appropriate to maintain the path's integrity and is inserted in the contiguous VC-4-4c path overhead. Thus the output port delivers an STM signal identical to that presented at the input port.

In a typical system performance reports and alarms would be passed to the element manager (EM). The EM (and SDH network management system) may be required to configure the VC-4's which constitute the VC-4-4vc in a preferred manner.

The invention is not limited to only VC-4-4c or VC-4-4vc. The invention applies to any number of VC-4s (ie. VC-4-nc or nvc where n may be in the range of 2-64 or higher)

The above embodiment is described by way of example only and does not limit the scope of the invention. In particular the present invention applies equally to signals and information structures other than VC-4, for example to VC-3, VC-2 and VC-1. Virtual container signal structures (including VC-4, AU3/VC-3, TU3/VC-3, VC-2 and VC-12) are defined by the ITU, for example in ITU-T G.707 (Draft) November 1995 published 1995.

The arrangement and method of this invention as described above in relation to VC-4 also applies to VC-3 signals. In particular the path overhead of these two signals is exactly similar, allowing the same method for processing of overhead bytes to be used for both types of signal. This applies equally to administrative unit three (AU3) VC-3 as to tributary unit three (TU3) VC-3 signals.

Referring to FIG. 2, this shows part of the structure of a lower order virtual container VC-2. In FIG. 2 only the first column of the VC-2 is shown to illustrate the positioning of the path overhead (POH) bytes V5, J2, N2 and K4. Also shown are fixed stuff bits R and data bits D. The fixed stuff bits of the first column make up eight whole bytes and other stuff bits and bytes are included in subsequent columns (not shown). The subsequent columns (not shown) comprise further data bits and bytes, together with overhead bits, justification opportunity bits and justification control bits the precise function of which is not relevant to the present disclosure but is detailed in the above ITU-T publication.

Figure 3:
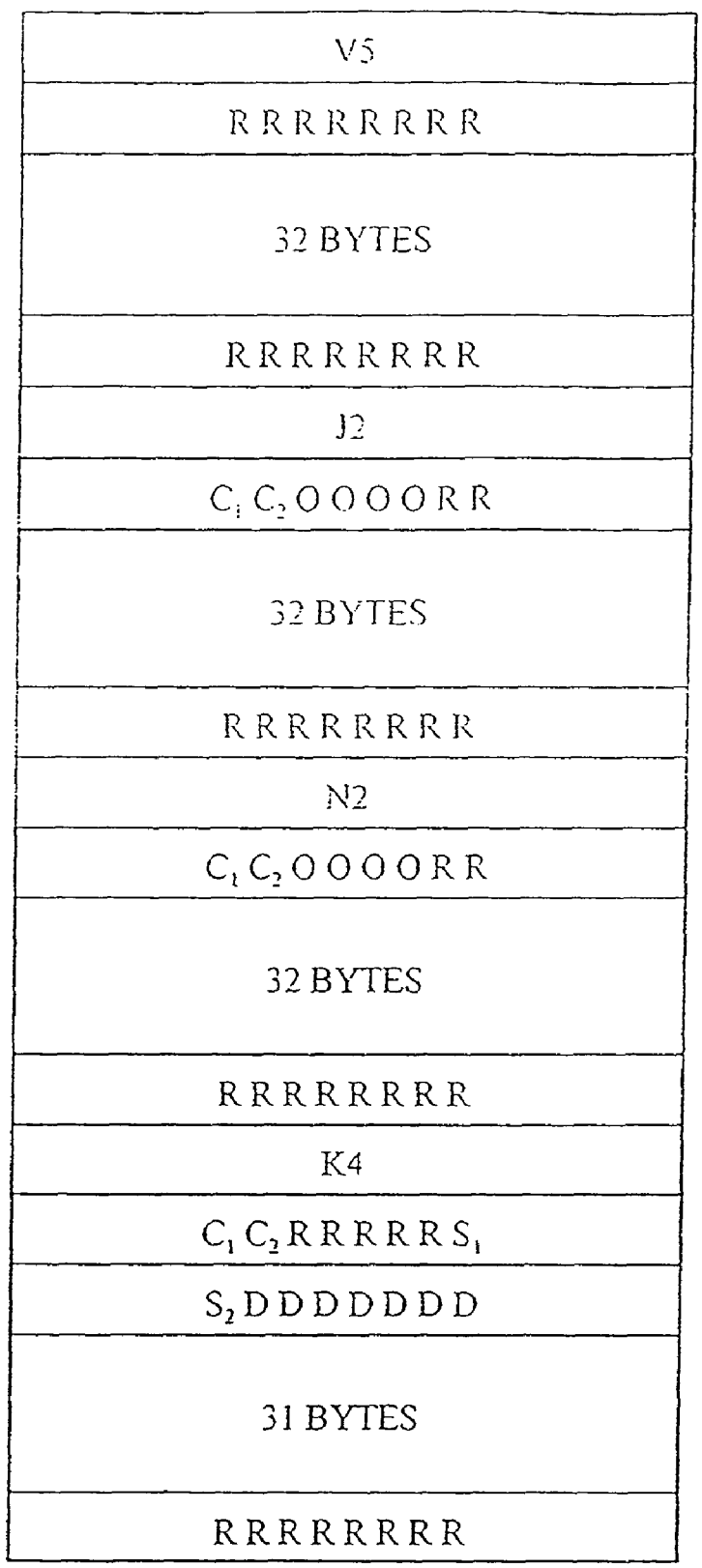
FIG. 3 shows the structure of a lower order, VC-12 signal of the prior art.

Referring to FIG. 3, this shows the structure of a lower order virtual container VC-12 with path overhead (POH) bytes V5, J2, N2 and K4. Data is carried in three units of 32 bytes plus one unit of 31 bytes. Other bytes are variously made up of fixed stuff bytes R, overhead bits O, justification opportunity bits S, justification control bits C and data bits D. The fixed stuff bits R make up five whole bytes and parts of three other bytes with a total of 49 bits. The precise functions of the other bits are not relevant to the present disclosure but are also detailed in the above ITU-T publication.

With lower order VCs (ie VC-2s and VC-1s) the conversion of the path overhead bytes will be slightly different. Accordingly to the invention, the contents of the V5, J2, N2 and K4 overhead bytes of the contiguous concatenated VC-2 and VC-1 signals (e.g. VC-2-5c or VC-12-4c), are transported in other bytes or bits in the virtually concatenated VC-2s/VC-1s. Suitable unused bits are the fixed stuff bits R or overhead bits O. These overhead bytes are restored before the signal is re-transmitted as a contiguous signal outside the network.

Thus VC-4, VC-3, VC-2 and VC-1 can all be transmitted as virtually or contiguously concatenated signals over ATM or PDH networks.

I claim:

1. A method of transporting a signal, comprising the steps of:
    converting the signal into a virtually concatenated information structure comprising a plurality of virtual containers, each virtual container comprising a plurality of frames and a path overhead, by distributing data from the signal across the virtual containers, and by using a part of the path overhead of each virtual container to indicate an order of the virtual containers in the virtually concatenated information structure and a sequence of the frames in each virtual container of the virtually concatenated information structure; and
    transmitting the virtual containers into a network.

2. The method as claimed in claim 1, wherein the signal has a payload capacity greater than a capacity of a virtual container.

3. The method as claimed in claim 1, wherein the signal is a contiguous signal.

4. The method as claimed in claim 1, further comprising the step of transporting the virtual containers across the network, wherein the virtual containers experience a differential delay as the virtual containers are transported across the network.

5. The method as claimed in claim 1, wherein the path overhead comprises an H4 byte, the method including the step of using the H4 byte for indicating the sequence of the frames.

6. The method as claimed in claim 1, wherein the path overhead comprises a J1 byte, the method including the step of using the J1 byte to indicate the order of the virtual containers in the virtually concatenated information structure.

7. A synchronous network for transporting a virtually concatenated information structure comprising a plurality of virtual containers, each virtual container comprising a plurality of frames and a path overhead, the synchronous network comprising:
    the virtual containers containing data from a signal distributed across the virtual containers; and
    a part of the path overhead of each virtual container being used to indicate an order of the virtual containers in the virtually concatenated information structure and a sequence of the frames in each virtual container of the virtually concatenated information structure.

8. The synchronous network as claimed in claim 7, wherein the path overhead comprises an H4 byte indicating the sequence of the frames.

9. The synchronous network as claimed in claim 7, wherein the path overhead comprises a J1 byte indicating the order of the virtual containers in the virtually concatenated information structure.

10. The synchronous network as claimed in claim 7, wherein the virtually concatenated information structure comprises a virtual container four (VC-4) or a virtual container three (VC-3) or an administrative unit three (AU-3).

11. A method of receiving a virtually concatenated signal, comprising the steps of:
    receiving a plurality of virtual containers of a virtually concatenated information structure, each virtual container comprising a plurality of frames and a path overhead, a part of the path overhead of each virtual container being used to indicate an order of the virtual containers in the virtually concatenated information structure and an original sequence of the frames in each virtual container of the virtually concatenated information structure;
    aligning the virtual containers according to said part of the path overhead of each virtual container to recover the order of the virtual containers and the original sequence of the frames; and
    recovering a signal from the virtual containers.

12. The method as claimed in claim 11, wherein the signal has a payload capacity greater than a capacity of a virtual container.

13. The method as claimed in claim 11, wherein the signal is a contiguous signal.

14. The method as claimed in claim 11, wherein the virtual containers experience a differential delay prior to said receiving step.

15. The method as claimed in claim 11, wherein the path overhead comprises an H4 byte indicating the original sequence of the frames.

16. The method as claimed in claim 11, wherein the path overhead comprises a J1 byte indicating the order of the virtual containers in the virtually concatenated signal.

17. An apparatus for transmitting a signal, comprising:
    a processor arranged to convert the signal into a virtually concatenated information structure comprising a plurality of virtual containers, each virtual container comprising a plurality of frames and a path overhead;
    an output for transmitting the virtual containers into a network, wherein the processor is arranged to convert the signal into the virtually concatenated information structure by distributing data from the signal across the virtual containers; and
    the processor being arranged to use a part of the path overhead of each virtual container to indicate an order of the virtual containers in the virtually concatenated information structure and a sequence of the frames in each virtual container of the virtually concatenated information structure.

18. The apparatus as claimed in claim 17, wherein said signal has a payload capacity greater than a capacity of a virtual container.

19. The apparatus as claimed in claim 17, wherein said signal is a contiguous signal.

20. The apparatus as claimed in claim 17, wherein the path overhead comprises an H4 byte, and wherein the processor is arranged to use the H4 byte for indicating the sequence of the frames.

21. The apparatus as claimed in claim 17, wherein the path overhead comprises a J1 byte, and wherein the processor is arranged to utilize the J1 byte to indicate the order of the virtual containers in the virtually concatenated information structure.

22. An apparatus for receiving a virtually concatenated signal, comprising:
    an input for receiving a plurality of virtual containers of a virtually concatenated information structure, each virtual container comprising a plurality of frames and a path overhead, a part of the path overhead of each virtual container being used to indicate an order of the virtual containers in the virtually concatenated information structure and an original sequence of the frames in each virtual container of the virtually concatenated information structure;

a buffer arranged to align the virtual containers according to said part of the path overhead of each virtual container to recover the order of the virtual containers and the original sequence of the frames; and a processor arranged to recover a signal from the virtual containers.

23. The apparatus as claimed in claim 22, wherein the path overhead comprises an H4 byte for indicating the original sequence of the frames, and wherein the buffer is arranged to recover the original sequence of the frames using said H4 byte.

24. The apparatus as claimed in claim 22, wherein the path overhead comprises a J1 byte to indicate the order of the virtual containers, and wherein the buffer is arranged to align the virtual containers according to the J1 byte.

25. A method of transmitting data in a virtually concatenated information structure comprising a plurality of virtual containers, each virtual container comprising a path overhead and a plurality of frames, the method comprising the step of: transmitting the data in a frame sequence and a virtual container order including the step of using a part of the path overhead of each virtual container to indicate the virtual container order in the virtually concatenated information structure and the frame sequence in each virtual container of the virtually concatenated information structure.

26. The method as claimed in claim 25, wherein the path overhead comprises H4 bits, and comprising the step of using the H4 bits for indicating the frame sequence.

27. The method as claimed in claim 25, wherein the path overhead comprises J1 bits, and comprising the step of using the J1 bits to indicate the virtual container order of the virtual containers in the virtually concatenated information structure.

28. The method as claimed in claim 25, comprising the steps of transmitting to a node of the network a form of data signal from outside the network, converting the signal into the virtually concatenated information structure, and transporting the signal through the network in the virtually concatenated information structure in which conversion of the signal comprises processing a path overhead of the signal.

29. The method as claimed in claim 28, comprising the step of converting the signal so transported into a signal of the same form as that transmitted to the network in which conversion of the signal comprises processing a path overhead of the signal.

30. The method as claimed in claim 29, wherein the signal transmitted to the network from outside the network is in a contiguous form.

31. The method as claimed in claim 29, and comprising the step of aligning the virtual containers of the virtually concatenated information structure by using a buffer.

32. The method as claimed in claim 31, wherein the path overhead comprises H4 bits and J1 bits, and comprising the step of controlling the aligning step according to contents of the J1 and H4 bits.

33. A synchronous network for transporting a virtually concatenated information structure comprising a plurality of virtual containers, each virtual container comprising a plurality of frames for carrying data in a frame sequence and a virtual container order, in which the virtually concatenated information structure comprises a path overhead, wherein a part of the path overhead indicates the virtual container order in the virtually concatenated information structure and the frame sequence in each virtual container of the virtually concatenated information structure.

34. The network as claimed in claim 33, wherein the path overhead comprises H4 bits for indicating the frame sequence.

35. The network as claimed in claim 33, wherein the path overhead comprises J1 bits for indicating the virtual container order of the virtual containers.

36. The network as claimed in claim 33, wherein the path overhead comprises B3 bits for providing an error indication.

37. The network as claimed in claim 33, wherein the virtually concatenated information structure comprises at least one of: a virtual container four (VC-4), a virtual container three (VC-3), and an administrative unit three (AU3).

38. The network as claimed in claim 33, and comprising tributary interfaces arranged and configured to process a signal received in a first form to convert the first form into a virtually concatenated form for transfer across the network; and wherein the tributary interfaces comprise a processor for processing the path overheads of the signal.

39. The network as claimed in claim 38, wherein the tributary interfaces are arranged and configured to process a signal transferred across the network in the virtually concatenated form and to convert the virtually concatenated form into the first form.

40. The network as claimed in claim 39, wherein the tributary interfaces comprise one or more buffers for ordering the virtual containers.

41. The network as claimed in claim 38, wherein the received signal is in a contiguous form.

42. The method as claimed in claim 1, wherein the step of transmitting the virtual containers is performed by transmitting the virtual containers into a synchronous network.

43. The method as claimed in claim 11, wherein the step of receiving the virtual containers is performed by receiving the virtual containers over a synchronous network.

44. The apparatus as claimed in claim 17, wherein the output for transmitting the virtual containers is operative for transmitting the virtual containers into a synchronous network.

45. The apparatus as claimed in claim 22, wherein the input for receiving the virtual containers is operative for receiving the virtual containers from a synchronous network.

46. The method as claimed in claim 25, wherein the step of transmitting the data is performed by transmitting the data over a synchronous network.

* * * * *

UNITED STATES PATENT AND TRADEMARK OFFICE
CERTIFICATE OF CORRECTION

| | | |
|---|---|---|
| PATENT NO. | : 7,920,604 B2 | Page 1 of 1 |
| APPLICATION NO. | : 11/541355 | |
| DATED | : April 5, 2011 | |
| INVENTOR(S) | : Abbas | |

It is certified that error appears in the above-identified patent and that said Letters Patent is hereby corrected as shown below:

On the title page, in item (57), under "ABSTRACT", in Column 2, Line 12, delete "contiguosly" and insert -- contiguously --, therefor.

Signed and Sealed this
Twenty-seventh Day of September, 2011

David J. Kappos
*Director of the United States Patent and Trademark Office*